US010776785B2

(12) United States Patent
Hammad et al.

(10) Patent No.: US 10,776,785 B2
(45) Date of Patent: Sep. 15, 2020

(54) SYSTEMS AND METHODS FOR DEVICE AUTHENTICATION

(71) Applicant: JPMorgan Chase Bank, N.A., New York, NY (US)

(72) Inventors: Ayman Hammad, Pleasanton, CA (US); Simon Clarke, Wilmington, DE (US)

(73) Assignee: JPMORGAN CHASE BANK, N.A., New York, NY (US)

(*) Notice: Subject to any disclaimer, the term of this patent is extended or adjusted under 35 U.S.C. 154(b) by 962 days.

(21) Appl. No.: 15/362,019

(22) Filed: Nov. 28, 2016

(65) Prior Publication Data

US 2017/0262850 A1 Sep. 14, 2017

Related U.S. Application Data

(63) Continuation-in-part of application No. 15/069,418, filed on Mar. 14, 2016.

(51) Int. Cl.
*G06Q 20/40* (2012.01)
*G06Q 20/32* (2012.01)

(52) U.S. Cl.
CPC ....... *G06Q 20/4014* (2013.01); *G06Q 20/322* (2013.01); *G06Q 20/3229* (2013.01); *G06Q 20/4016* (2013.01)

(58) Field of Classification Search
CPC .............................................. G06Q 20/4014
See application file for complete search history.

(56) References Cited

U.S. PATENT DOCUMENTS

2011/0238575 A1 9/2011 Nightengale et al.
2012/0143752 A1* 6/2012 Wong .................. H04L 63/10
                                                    705/41

(Continued)

FOREIGN PATENT DOCUMENTS

WO       2006118968       11/2006

OTHER PUBLICATIONS

JPmorgan chase bank NA seeks patent for systems and methods for device authentication. (Sep. 14, 2017). Global IP News.Information Technology Patent News Retrieved from https://search.proquest.com/docview/1939235228?accountid=14753.*

(Continued)

*Primary Examiner* — Muriel S Tinkler
(74) *Attorney, Agent, or Firm* — Greenberg Traurig LLP

(57) ABSTRACT

Systems and methods for device authentication are disclosed. In one embodiment, a method may include (1) an acquirer portion receiving a device credential and a payment credential that were received from the payment application in conjunction with a transaction, the acquirer portion further receiving transaction data for the transaction from the merchant; (2) the acquirer portion performing a first validation assessment on the transaction based on the transaction data and first data retrieved from a first data source; (3) the payment network portion performing a second validation assessment on the transaction based on the transaction data and second data retrieved from a second data source; and (4) the issuer portion identifying and authenticating the customer based on the device credential, the payment credential, and at least one of the first validation assessment and the second validation assessment.

20 Claims, 4 Drawing Sheets

(56) References Cited

U.S. PATENT DOCUMENTS

| | | |
|---|---|---|
| 2012/0171992 A1 | 7/2012 | Cheong et al. |
| 2014/0114857 A1 | 4/2014 | Griggs et al. |
| 2015/0095225 A1 | 4/2015 | Appana et al. |
| 2015/0106260 A1 | 4/2015 | Andrews et al. |
| 2015/0161587 A1* | 6/2015 | Khan ................ G06Q 20/3226 705/44 |
| 2016/0071108 A1* | 3/2016 | Caldera ............. G06Q 20/4016 705/75 |

OTHER PUBLICATIONS

WIPO Publishes Patent of Jpmorgan Chase Bank for "Systems and Methods for Device Authentication" (American Inventors). (Sep. 24, 2017). US Fed News Service, Including US State News Retrieved from https://search.proquest.com/docview/1942057005?accountid=14753.*

European Search Report, dated Sep. 9, 2019 from corresponding European Patent Application No. 17767320.9.

Anonymous, The Basics You Need to Know about Visa's Card Verification Value (CVV), UniBul's Money Blog, Sep. 26, 2011.

PCT International Search Report and PCT Written Opinion, International Application No. PCT/US2017/022272, dated May 18, 2017, pp. 1-10.

* cited by examiner

SYSTEMS AND METHODS FOR DEVICE AUTHENTICATION

RELATED APPLICATIONS

This application is a Continuation-In-Part of U.S. patent application Ser. No. 15/069,418, filed Mar. 14, 2016, the disclosure of which is hereby incorporate, by reference, in its entirety.

BACKGROUND OF THE INVENTION

1. Field of the Invention

The present invention generally relates to systems and methods for device authentication.

2. Description of the Related Art

It is commonplace for customers to conduct transactions online using a mobile device. For example, a customer may select an item and go to a "checkout screen" where the user then enters his or her credit card information, billing address, and shipping address. The merchant then provides this information to a financial institution to authorize the underlying transaction.

SUMMARY OF THE INVENTION

Systems and methods for device authentication are disclosed. In one embodiment, a payment system may include a financial institution that may include an acquirer portion; a payment network portion; and an issuer portion. The acquirer portion may communicate with the issuer portion via the payment network portion. The system may further include a merchant having a merchant-acquirer relationship with the financial institution, the merchant in communication with the acquirer portion using a first network; and a mobile electronic device associated with a customer comprising at least one computer processor executing a mobile payment application. The acquirer portion may receive, from the merchant, at least one mobile device credential and a payment credential that were received from the mobile payment application in conjunction with a transaction, the acquirer portion further receiving transaction data for the transaction from the merchant. The issuer portion may receive, via the payment network portion, the mobile device credentials, the payment credentials, and transaction data from the acquirer portion. The issuer portion may identify and authenticate the customer based on the mobile device credentials and the payment credential.

In one embodiment, the acquirer portion and/or the payment network portion is associated with a partner of the financial institution.

In one embodiment, the acquirer portion may further host a risk management service, and the risk management service receives the at least one mobile device credential from the mobile payment application.

In one embodiment, the at least one mobile device credential comprises at least one of mobile device operating system data, mobile device browser data, mobile device locale data, mobile device system data, mobile device settings data, mobile device cookie data, mobile application data, and a mobile device identifier.

In one embodiment, the mobile application may communicate with the issuer portion using a second network.

In one embodiment, the acquirer portion, a risk management service executed by the merchant, a risk management service executed by the acquirer, and the issuer portion may deny the transaction. The transaction may be denied for at least one of a shipping address not matching a billing address; a velocity of transactions with the payment credential; an IP address of the mobile device; and a proxy being used with the mobile device.

In one embodiment, the payment network portion may provide real-time two-way communication between the issuer portion and the merchant.

A method for authenticating a device may include, at a financial institution comprising an acquirer portion, a payment network portion, and an issuer portion: (1) the acquirer portion receiving, from the merchant, at least one mobile device credential and a payment credential that were received electronically from a mobile payment application executed by a mobile electronic device in conjunction with a transaction, the acquirer portion further receiving transaction data for the transaction from the merchant; (2) the issuer portion receiving, via the payment network portion, the mobile device credentials, the payment credentials, and transaction data from the acquirer portion; and (3) at least one computer processor at the issuer portion identifying and authenticating the customer based on the mobile device credentials and the payment credential.

In one embodiment, the acquirer portion and/or the payment network portion may be associated with a partner of the financial institution.

In one embodiment, a risk management service hosted by the acquirer portion may receive the at least one mobile device credential from the mobile payment application.

In one embodiment, the at least one mobile device credential comprises at least one of mobile device operating system data, mobile device browser data, mobile device locale data, mobile device system data, mobile device settings data, mobile device cookie data, mobile application data, and a mobile device identifier.

In one embodiment, the mobile application may communicate with the issuer portion using a second network.

In one embodiment, the method may further include the at least one computer processor at the issuer portion authorizing the transaction.

In one embodiment, the method may further include the at least one computer processor at the issuer portion associating the authorization with the at least one mobile device credential.

In one embodiment, the method may further include denying the transaction by at least one of the an acquirer portion, a risk management service executed by the merchant, a risk management service executed by the acquirer, and the issuer portion. The transaction may be denied for at least one of a shipping address not matching a billing address; a velocity of transactions with the payment credential; an IP address of the mobile device; and a proxy being used with the mobile device.

In one embodiment, the method may further include at least one of the an acquirer portion, a risk management service executed by the merchant, and a risk management service executed by the acquirer normalizing at least one of the payment credential and the transaction data.

In one embodiment, the method may further include at least one of the an acquirer portion, a risk management service executed by the merchant, and a risk management service executed by the acquirer validating a shipping address using third party data.

In one embodiment, a payment system may include a financial institution comprising an acquirer portion, a payment network portion, and an issuer portion. The acquirer portion may communicates with the issuer portion via the payment network portion, the merchant may have a merchant-acquirer relationship with the financial institution and may be in communication with the acquirer portion using a first network, and a mobile electronic device associated with a customer comprising at least one computer processor executing a mobile payment application. The acquirer portion may receive, from the merchant, at least one device credential and a payment credential that were received from the mobile payment application in conjunction with a transaction, the acquirer portion further receiving transaction data for the transaction from the merchant, and may perform a first validation assessment on the transaction based on the transaction data. The payment network portion may receive, from the acquirer portion, the device credential, the payment credential, the transaction data, and the first validation assessment; and may perform a second validation assessment on the transaction based on the transaction data. The issuer portion may receive, from the payment network portion, the device credential, the payment credentials, and transaction data from the acquirer portion, and may identify and authenticate the customer based on the device credential, the payment credential, and at least one of the first validation assessment and the second validation assessment.

In one embodiment, the device may be a mobile electronic device.

In one embodiment, the acquirer portion and/or the payment network portion may be associated with a partner of the financial institution.

In one embodiment, the acquirer portion may perform the first validation assessment on the transaction based on the transaction data and data retrieved from a third party data source. The third party data source may be an address database, an identity verification service, a fraud database, an IP address database, a device information database, etc.

In one embodiment, the first validation assessment and/or the second validation assessment may be a risk score.

In one embodiment, the acquirer portion may provide the first validation assessment to the payment network portion.

In one embodiment, the payment network portion may perform the second validation assessment on the transaction based on the transaction data and data retrieved from a third party data source. The third party data source may be an address database, an identity verification service, a fraud database, an IP address database, a device information database, etc.

In one embodiment, the payment network portion may provide the first validation assessment and the second validation assessment to the issuer portion.

In one embodiment, the payment network portion may update the first validation assessment with the second validation assessment, and provide the second validation assessment to the issuer portion.

In one embodiment, the issuer portion may further perform a first validation assessment on the transaction based on the transaction data and data retrieved from a third party data source. The third party data source may be an address database, an identity verification service, a fraud database, an IP address database, a device information database, etc.

According to another embodiment a method for authenticating a transaction may include, at a financial institution comprising an acquirer portion, a payment network portion, and an issuer portion: (1) the acquirer portion receiving, from the merchant, at least one device credential and a payment credential that were received from the mobile payment application in conjunction with a transaction, the acquirer portion further receiving transaction data for the transaction from the merchant; (2) the acquirer portion performing a first validation assessment on the transaction based on the transaction data and first data retrieved from a first data source; (3) the payment network receiving, from the acquirer portion, the device credential, the payment credential, the transaction data, and the first validation assessment; (4) the payment network portion performing a second validation assessment on the transaction based on the transaction data and second data retrieved from a second data source; (5) the issuer portion receiving, from the payment network portion, the device credential, the payment credentials, transaction data from the acquirer portion and the first validation assessment, and the second validation assessment; and (6) the issuer portion identifying and authenticating the customer based on the device credential, the payment credential, and at least one of the first validation assessment and the second validation assessment.

In one embodiment, the device may be a mobile electronic device.

In one embodiment, the first data source and the second data source may include an address database, an identity verification service, a fraud database, an IP address database, a device information database, etc.

In one embodiment, the method may further include the acquirer portion denying the transaction based on the first validation assessment.

In one embodiment, the method may further include the payment network portion denying the transaction based on at least one of the first validation assessment and the second validation assessment.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
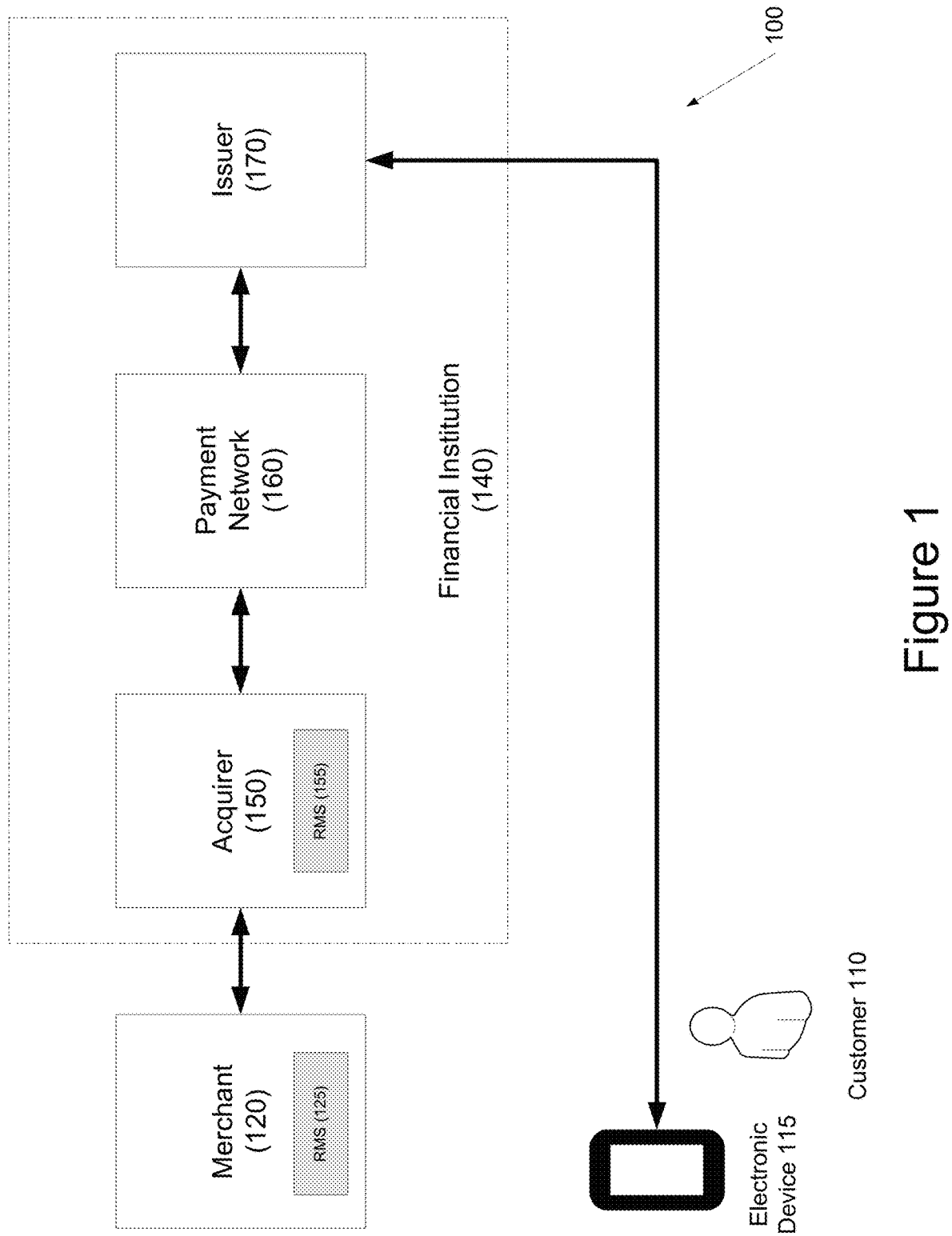
FIG. 1 depicts a system for device authentication according to one embodiment.

Several embodiments of the present invention and their advantages may be understood by referring to FIGS. 1-4.

Embodiments disclosed herein facilitate on-line transactions involving a mobile device.

Embodiments disclosed herein may leverage a device identification method to provide low friction payment interactions in conducing online payments, mobile wallet payments, etc., and may influence merchants in adopting a consistent and/or standard device identification methodology.

In one embodiment, a single store of device fingerprints captured by merchants that link the method of creation to the device fingerprint along with the date it was created and the method by which it was created is disclosed. The device fingerprint may further identify a link between the device fingerprint and payment transactions sourced by a payment processor. For example, the link may identify that a particular payment came from a particular device.

Embodiments disclose methodologies that may assess the device trustworthiness based on prior user actions on the device. In one embodiment, an issuer may provide one or more of an assessment of the device and a the customer and return a trustworthiness assessment of the device, a recognition value for the consumer and an assessment of a transaction risk.

In one embodiment, certain devices may be certified. For example, specific configurations of web and/or mobile systems that test the merchants ability to recognize them may be certified.

In one embodiment, when a merchant has registered a customer device and wants to submit a device fingerprint with the payment transaction, the merchant may provide a shorter unique identifier provided by an issuer along with other enhanced data (e.g., device fingerprint information).

In another embodiment, when a merchant submits a payment transaction, the issuer may provide the additional data points necessary to support device fingerprinting (e.g., as determined by risk) to the authorization flow as enhanced data.

In one embodiment, merchants may be able to submit, along with the device fingerprint, additional information such as customer name and address in order to provide a full consumer persona for assessment by the issuer. The issuer may provide an assessment of the device and consumer persona and return a trust score of the device, a recognition value for the consumer and an assessment of transaction risk.

In one embodiment, an on-line payment system may include an option for device recognition and enablement of "1-Click" shopping that includes a default payment product and shipping address and the ability to opt for a lightweight verification mechanism. The merchant may accept the payment method and shipping address and process the payment without prompting the user for further information unless the customer has opted for a light weight verification mechanism which will be invoked and the results will affect the notification back to the merchant as the consumer may opt not to proceed with payment.

In one embodiment, the customer may to determine the level of interaction available for "1-Click" shopping. For example, the customer may configure it to allow selection from a set of payment devices and to determine which shipping address to use based on identified devices.

Referring to FIG. 1, a system for device authentication is disclosed according to one embodiment. System 100 may include customer 110, merchant 120, and financial institution 140. In one embodiment, acquirer 150, payment network 160, and issuer 170 may all be associated with or under the control of financial institution 140 or a payment processing partner of financial institution 140.

Customer 110 may interact with merchant 120 using device 115. Device 115 may be any suitable electronic device that may execute a wallet application, access a merchant website, execute a payment application, etc.

In one embodiment, device 115 may be a mobile electronic device, such as a smartphone, tablet computer, etc.

In one embodiment, merchant 120 may have a relationship with financial institution 140, such as a merchant-acquirer relationship.

Merchant 120 and acquirer 150 may provide risk management services (RMS) 125 and 155, respectively. RMS 125 may collect device fingerprint data from device 115. The device fingerprint data may be used to uniquely identify device 115 from other devices. Device fingerprint data may include, for example, operating system data (e.g., operating system version number, etc.), browser data (e.g., browser, version, etc.), locale data (e.g., country, language, etc.), hardware/system data (e.g., operating system, screen resolution, screen aspect ratio, manufacturer, serial number, SIM card, jailbreak information, etc.), settings data, cookie data, mobile application data, etc. It may further collect data from a mobile wallet application, such as user id and password. Other device data may be used as is necessary and/or desired.

Merchant 120 may also collect transaction information, including, for example, customer information (name, shipping address, etc.), payment information (e.g., card number), and price data.

In one embodiment, RMS 155 may receive the device fingerprint data from RMS 125, and may provide the device fingerprint data to issuer 170 via payment network 170.

In one embodiment, RMS 125 and/or RMS 155 may receive, for example, information about the customer, transaction information (e.g., amount of transaction, shipping address, billing address, etc.), content of the customer's shopping card, the frequency of usage of the payment instrument (e.g., credit card), information from third parties (e.g., confirmation that the shipping address is valid from the United States Postal Service), aging information, number of customer transactions with merchant, email address black list, IP/proxy blacklist, etc.

In one embodiment, because acquirer 150, payment network 160, and issuer 170 may be part of, or under the control of, financial institution 140, decision making among these elements may be distributed. In addition, RMS 125 and RMS 155 may also be included in the distributed decision making. For example, one or more of RMS 125, acquirer 150, RMS 155, and issuer 170 may compare the shipping address to the billing address; may determine if there are suspicious number of deliveries to that email address; may determine if there are a suspicious number of transactions using the payment instrument with multiple merchants; may determine if there are a suspicious number of transactions from different IP addresses using the same payment instrument; may determine if the card is being used on a device with a proxy; etc.

In one embodiment, payment network 160 may be an enhanced payment network that may communicate additional data, such as device data, to the issuer. An example of such a payment network is ChaseNet. In one embodiment, payment network 160 may provide two-way communication from the merchant to the issuer that may provide portions of real-time authorization, portions of non-real time authorization, and combinations thereof. For example, transaction data may be provided in real-time to authorize the transaction, but if a shipping address does not match a billing address, a flag may be provided in real-time, but details on the discrepancy (e.g., the mismatched address) may be provided in due course.

In one embodiment, learning may be used to inform acquirer 150, RMS 155, merchant 120, RMS 125, and/or device 115 of transaction issues. For example, issuer 170 may determine that the financial instrument submitted for a transaction is valid, but the device is invalid. Issuer 170 may inform acquirer 150 to deny the transaction and merchant 120 to not ship the order. In one embodiment, the application on device 115 may be deactivated, have the financial instrument removed, an out-of-band message communicated to customer 110, etc.

In one embodiment, RMS 125 and/or RMS 155 may update respective databases with transaction information.

In one embodiment, customer 110 may interact with issuer 170 directly using device 115. For example, device 115 may execute an application (not shown) associated with issuer 170, access issuer 170's website, etc. In one embodiment, issuer 170 may authenticate device 115 and/or customer 110 directly.

Figure 2:
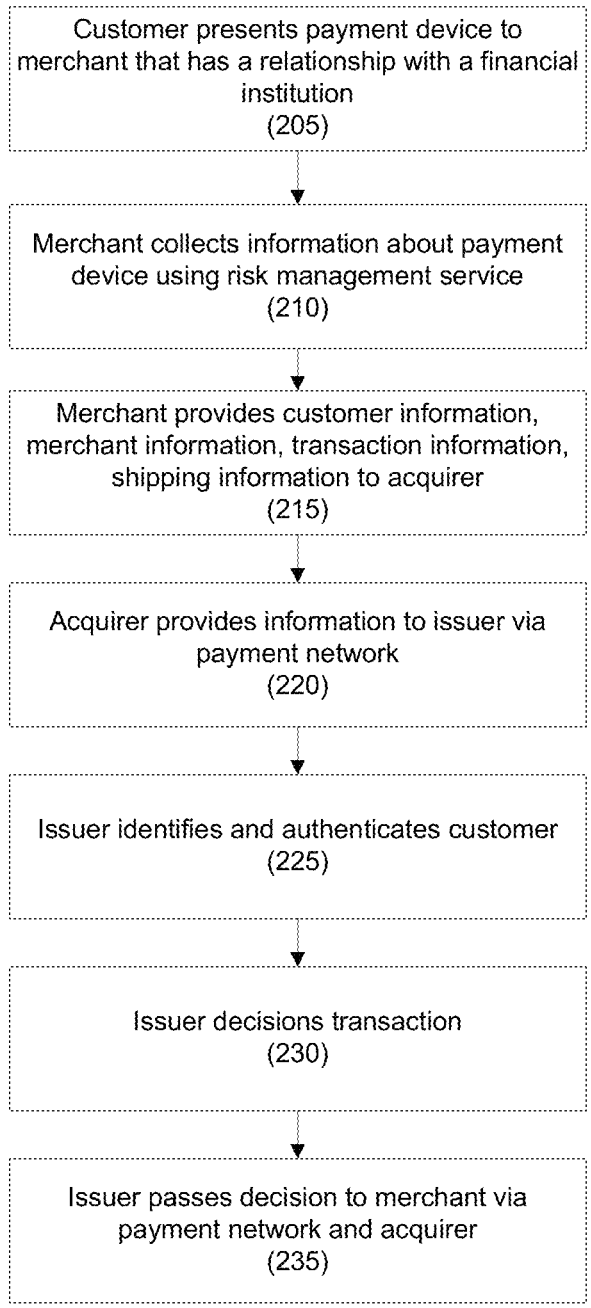
FIG. 2 depicts a method for device authentication according to one embodiment.

Referring to FIG. 2, a method of device authentication is disclosed according to one embodiment.

In step 205, a customer that is conducting a transaction may present a payment device to a merchant. In one embodiment, customer may present the payment device using, for example, a mobile wallet application executed by a mobile electronic device.

In step 210, the merchant may collect payment device information and device information from the device. In one embodiment, this may be performed by, on in conjunction with, a risk management service (RMS). In one embodiment, the information that may be collected may include customer information, payment information, transaction information, shipping information, and device information.

In one embodiment, the combination of the payment device information (e.g., a credit card number) and device information may be sufficient to identify and authenticate the customer without requiring additional logging in to the financial institution and/or merchant.

In step 215, the merchant and/or RMS may provide the collected information to its acquirer.

In one embodiment, the acquirer may perform partial decisioning on the transaction. For example, the acquirer may compare the shipping address for the transaction to the billing address for inconsistencies.

In step 220, the acquirer may provide the collected information to the issuer using, for example, a payment network. In one embodiment, the acquirer, the payment network, and the issuer may all be part of, associated with, and/or controlled by the financial institution.

In one embodiment, the payment network may handle a larger amount of data than a conventional payment network, such as VisaNet. An example of a suitable payment network is ChaseNet. Such a payment network may communicate additional data, such as the device information, in addition to the payment device information and transaction information.

In one embodiment, the acquirer, either RMS, and/or the issuer may normalize the data from the merchant. For example, each merchant may collect customer data, device data, etc. in a different format. Thus, any or the acquirer, RMSs, or the issuer may normalize the data (e.g., look up the missing digits from the nine digit ZIP code if only five digits are provided) so that it has a common format.

For example, a merchant may have its own template for receiving customer date (e.g., customer name fields, customer address fields, customer In step 225, the issuer may authenticate the customer based on the payment device information and the device information. In one embodiment, the combination of the payment device and the device is sufficient to authenticate the customer.

In one embodiment, intelligence may be used to take appropriate action(s) following the authentication, or lack thereof. For example, if a customer cannot be authenticated because the device could not be validated, but the credit card number was valid, only transactions from the device may be blacklisted, while transactions with the card may be approved. Additional actions, including sending out-of-band messages to the customer, disabling an electronic wallet, disabling an on-line account, etc. may be taken as is necessary and/or desired.

In one embodiment, issuer may communicate the lack of authentication to the acquirer and/or the merchant. Thus, if the same device attempts the transaction with the same payment device, the acquirer may deny the transaction without involvement from the issuer.

In one embodiment, once the customer is authenticated, the customer may be authenticated with other merchants that have a similar relationship with the financial institution.

In step 230, the issuer may decision the transaction (e.g., approve or deny the transaction) based on the transaction information, account information, etc.

In step 235, the issuer may provide the decision to the merchant and the acquirer via the payment network.

In one embodiment, the issuer may provide the decision to the acquirer, merchant, and the device.

Figure 3:
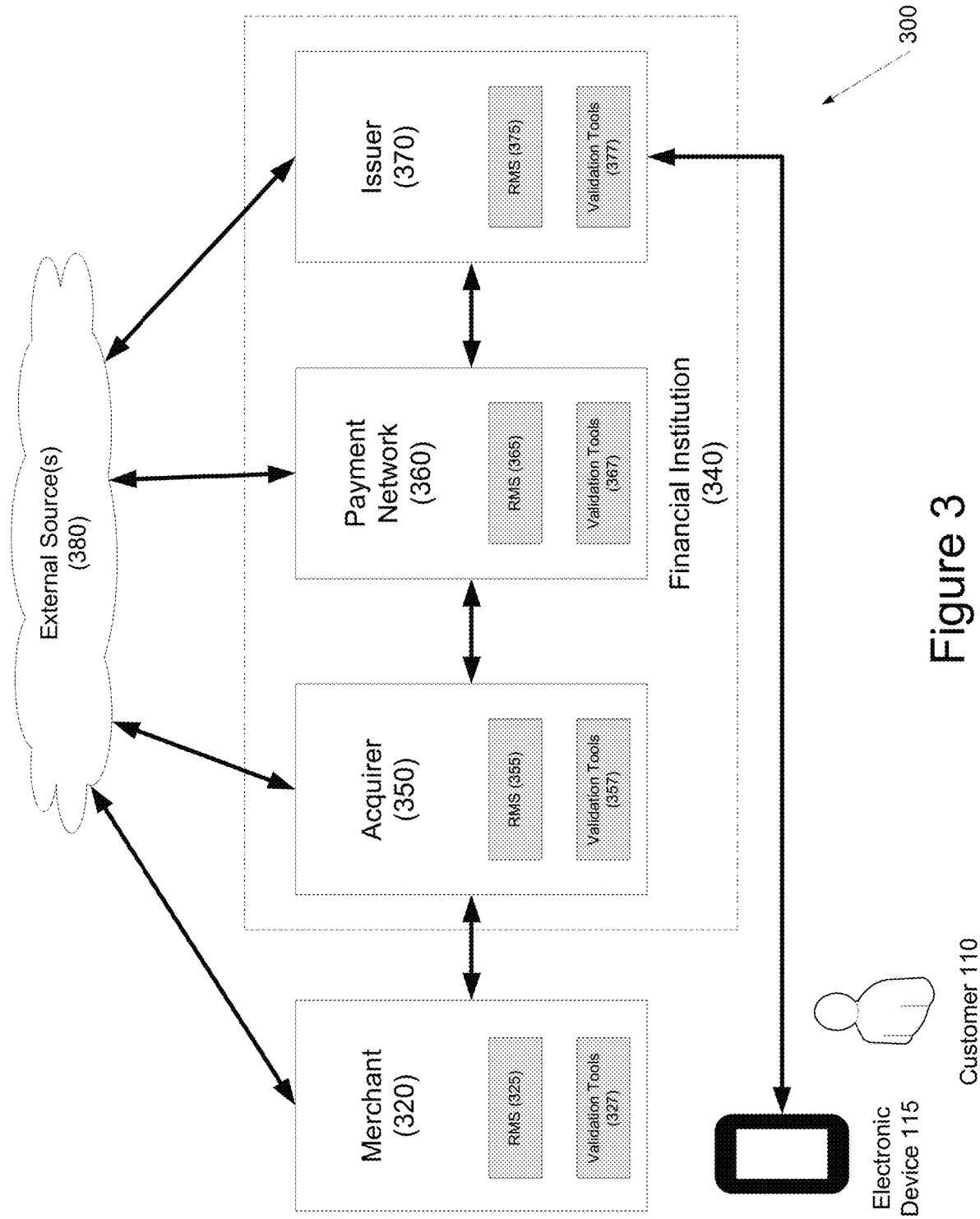
FIG. 3 depicts a system for conducting a transaction according to one embodiment.

Referring to FIG. 3, a system for conducting a transaction is disclosed according to one embodiment. System 300 may include customer 110, merchant 320, and financial institution 340. In one embodiment, acquirer 350, payment network 360, and issuer 370 may all be associated with or under the control of financial institution 340 or a payment processing partner of financial institution 340.

In one embodiment, merchant 320, acquirer 350, payment network 360, issuer 370, and financial institution 340 may be similar to merchant 120, acquirer 150, payment network 160, issuer 170, and financial institution 140, respectively.

In one embodiment, merchant 320, acquirer 350, payment network 360, issuer 370 may each be provided with risk management system (RMS) 325, 355, 365, and 375, respectively. RMS 325, RMS 355, RMS 365, and RMS 375 may function similar to RMS 125 and RMS 155, described above.

In one embodiment, merchant 320, acquirer 350, payment network 360, issuer 370 may be provided with validation tools 327, validation tools 357, validation tools 367, and 377, respectively. In one embodiment, validation tools may access internal and/or external source(s) 380 for data validation. For example, merchant 320 may use validation tool 327 to validate the existence and validity of a shipping address, while acquirer 350 may use validation tools 357 to check against a database of fraudulent addresses, verified good addresses, etc.

Validation tools 327, 357, 367, and 377 may work with associated RMS 325, RMS 355, RMS 365, and RMS 375 to perform distributed decision making regarding each transaction.

In one embodiment, merchant 320, acquirer 350, payment network 360, issuer 370 may communicate with one or more external source 380 to retrieve information that may assist in the distributed decision making. Example external sources may include address information (e.g., U.S. Postal Service databases), fraud databases, IP address databases, device information databases, other customer purchase information from other merchants, financial institutions, identity validation services, device operators for carrier verification, social engineering and analytics (e.g., Axciom or Experian), compromised email databases, etc.

In one embodiment, RMS 325, 355, 365, 375 and/or Validation Tools 327, 357, 367, 377 may receive a transaction and provide an assessment of the transaction. Depending on its position within the transaction chain (e.g., merchant, acquirer, payment network, or issuer), RMS 325, 355, 365, 375 and/or Validation Tools 327, 357, 367, 377 may receive an assessment from one or more prior elements in the transaction chain. For example, RMS 365 and/or Validation Tools 367 may receive assessments from RMS 325/Validation Tools 327 and RMS 355/Validation Tools 357.

For example, a merchant tool and/or RMS may assess the accuracy and validity of the customer information based on the information collected including the type of merchandise, the velocity at the merchant level, the IP address, and device fingerprint, device status (e.g., new, old, etc.), etc. Acquirer 350 may use some or all of the information as merchant 320 to validate whether they are any risk intelligence seen for the customer 110 based on all transactions across all the merchants for which this acquirer is processing, Payment network 360 may evaluate a transaction against, for example, a compromised card database, identify theft info, etc. across all the issuers information for the given card holder name or specific information, such as email address, etc. Issuer 370 may perform its own validation based on card information as well as the full relationship with the consumer, including, for example, identifying possible account take over based on recent changes in key consumer information, a velocity across all merchants for the given consumer/card, etc.

In one embodiment, each RMS 325, 355, 365, 375 and/or Validation Tools 327, 357, 367, 377 may provide an individual assessment, or it may modify the assessment from the prior element(s) in the transaction chain.

In one embodiment, the assessment may be a go/no-go, a risk score, a flag for further investigation, etc. Any suitable assessment technique may be used as is necessary and/or desired.

In one embodiment, each element in the transaction chain may have a specific responsibility for transaction assessment. For example, RMS 355 and/or Validation Tools 357 for acquirer 350 may verify the shipping address, and RMS 365 and/or Validation Tools 367 for payment network 360 may verify the IP address for the incoming transaction. In another embodiment, the elements may provide redundant validation. Any suitable responsibility distribution may be used as is necessary and/or desired.

In one embodiment, any element in the transaction chain may reject a transaction based on its respective RMS and/or validation tools. In another embodiment, only RMS 375 and/or Validation Tools 377 for issuer 370 may rejection a transaction. In one embodiment, RMS 375 and/or Validation Tools 377 may consider assessments from one or more of RMS 325/Validation Tools 327, RMS 355/Validation Tools 357, and RMS 365/Validation Tools 367.

Figure 4:
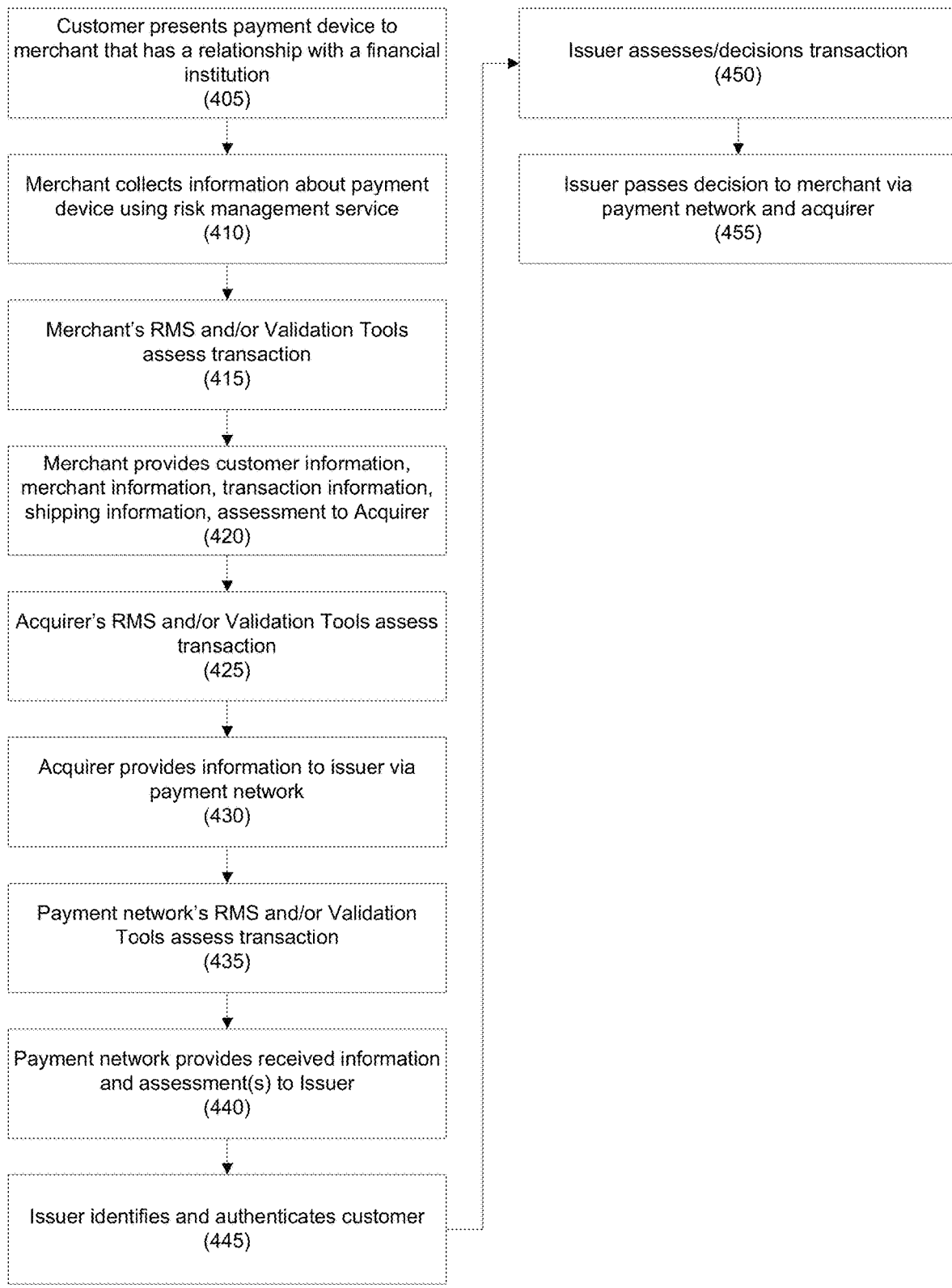
FIG. 4 depicts a method for conducting a transaction according to one embodiment.

Referring to FIG. 4, a method for conducting a transaction is disclosed according to one embodiment. In step 405, a customer that is conducting a transaction may present a payment device to a merchant. In one embodiment, customer may present the payment device using, for example, a wallet application, and in step 410, the merchant may collect payment device information and device information from the device. These steps may be similar to steps 205 and 210, respectively.

In one embodiment, in step 415, the merchant's RMS and/or validation tools may perform partial decisioning on the transaction. In one embodiment, merchant may communicate with one or more external source to assess the transaction.

In step 420, the merchant and/or RMS/Validation tools may provide the collected information to its acquirer. This may be similar to step 215, above, and it may further include the assessment of the transaction.

In step 425, the acquirer's RMS and/or Validation Tools may assess the transaction and may perform partial decisioning on the transaction. In one embodiment, the acquirer's RMS and/or Validation Tools may access external sources to assess the transaction. The assessment may be provided in any suitable manner (e.g., go, no-go, risk score, etc.).

In one embodiment, the acquirer's RMS and/or Validation Tools may provide an independent assessment, or may modify the assessment of the merchant.

In one embodiment, instead of, or in addition to, providing an assessment, the acquirer's RMS and/or Validation Tools may reject the transaction.

In step 430, the acquirer may provide the collected information and assessment(s) to the issuer using, for example, a payment network. In one embodiment, the acquirer, the payment network, and the issuer may all be part of, associated with, and/or controlled by the financial institution. This may be similar to step 220, above.

In one embodiment, the payment network may handle a larger amount of data than a conventional payment network, such as VisaNet. An example of a suitable payment network is ChaseNet. Such a payment network may communicate additional data, such as the device information, in addition to the payment device information and transaction information.

In one embodiment, the acquirer, either RMS, and/or the issuer may normalize the data from the merchant. For example, each merchant may collect customer data, device data, etc. in a different format. Thus, any or the acquirer, RMSs, or the issuer may normalize the data (e.g., look up the missing digits from the nine digit ZIP code if only five digits are provided) so that it has a common format.

For example, a merchant may have its own template for receiving customer date (e.g., customer name fields, customer address fields, customer In step 435, the payment network's RMS and/or Validation Tools may assess the transaction and may perform partial decisioning on the transaction. In one embodiment, the payment network's RMS and/or Validation Tools may access external sources to assess the transaction. The assessment may be provided in any suitable manner (e.g., go, no-go, risk score, etc.).

In one embodiment, the assessment performed by the payment network RMS and/or payment network may verify different aspects of the transaction from what was verified by the acquirer's RMS and/or payment network. In another embodiment, the verification may be the same, thereby providing redundancy. Any suitable arrangement of verifications may be provided as necessary and/or desired.

In one embodiment, the payment network's RMS and/or Validation Tools may provide an independent assessment, or may modify the assessment of the merchant and/or acquirer.

In one embodiment, instead of, or in addition to, providing an assessment, the payment network's RMS and/or Validation Tools may reject the transaction.

In step 440, the payment network and/or RMS/Validation tools may provide the collected information to the issuer. This may include all information received by the payment network as well as its assessment.

In step 445, the issuer may authenticate the customer based on the payment device information and the device information. This may be similar to step 225, above.

In step 450, the issuer's RMS and/or Validation Tools may assess or decision the transaction and may perform partial decisioning on the transaction. In one embodiment, the issuer's RMS and/or Validation Tools may access external sources to assess the transaction. The assessment may be provided in any suitable manner (e.g., go, no-go, risk score, etc.).

In one embodiment, the assessment performed by the issuer's RMS and/or payment network may verify different aspects of the transaction from what was verified by the acquirer's or payment network's RMS and/or payment network. In another embodiment, the verification may be the same, thereby providing redundancy. Any suitable arrangement of verifications may be provided as necessary and/or desired.

In one embodiment, the issuer's RMS and/or Validation Tools may provide an independent assessment, or may modify the assessment of the merchant acquirer, and/or payment network.

In step 455, the issuer may provide the decision to the merchant and the acquirer via the payment network. This may be similar to step 235, above.

Although several embodiments have been disclosed, it should be recognized that the embodiments are not necessarily exclusive.

The following documents are hereby incorporated, by reference, in their entireties: U.S. patent application Ser. No. 14/699,511, U.S. Provisional Patent Application Ser. No. 62/148,493, filed Apr. 16, 2015; U.S. Provisional Patent Application Ser. No. 62/107,800, filed Jan. 26, 2015; and U.S. Provisional Patent Application Ser. No. 62/037,891, filed Aug. 15, 2014.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A payment system, comprising:
   a financial institution comprising:
      an acquirer portion;
      a payment network portion; and
      an issuer portion;
      wherein the acquirer portion communicates with the issuer portion via the payment network portion;
   a merchant having a merchant-acquirer relationship with the financial institution, the merchant in communication with the acquirer portion using a first network; and
   an electronic device associated with a customer comprising at least one computer processor executing a payment application;
   wherein:
      the acquirer portion receives, from the merchant, at least one device credential and a payment credential that were received from the payment application in conjunction with a transaction, the acquirer portion further receiving transaction data for the transaction from the merchant;

the acquirer portion performs a first validation assessment on the transaction based on the transaction data;

the payment network portion receives, from the acquirer portion, the device credential, the payment credential, the transaction data, and the first validation assessment;

the payment network portion performs a second validation assessment on the transaction based on the transaction data;

the issuer portion receives, from the payment network portion, the device credential, the payment credentials, and transaction data from the acquirer portion; and the issuer portion identifies and authenticates the customer based on the device credential, the payment credential, and at least one of the first validation assessment and the second validation assessment.

2. The system of claim 1, wherein at least one of the acquirer portion and the payment network portion is associated with a partner of the financial institution.

3. The system of claim 1, wherein the acquirer portion performs the first validation assessment on the transaction based on the transaction data and data retrieved from a third party data source.

4. The system of claim 3, wherein the third party data source comprises at least one of an address database, and an identity verification service.

5. The system of claim 3, wherein the third party data source comprises at least one of a fraud database, an IP address database, and a device information database.

6. The system of claim 1, wherein at least one of the first validation assessment and the second validation assessment comprises a risk score.

7. The system of claim 1, wherein the acquirer portion provides the first validation assessment to the payment network portion.

8. The system of claim 1, wherein the payment network portion performs the second validation assessment on the transaction based on the transaction data and data retrieved from a third party data source.

9. The system of claim 8, wherein the third party data source comprises at least one of an address database, and an identity verification service.

10. The system of claim 8, wherein the third party data source comprises at least one of a fraud database, an IP address database, and a device information database.

11. The system of claim 1, wherein the payment network portion provides the first validation assessment and the second validation assessment to the issuer portion.

12. The system of claim 1, wherein the payment network portion updates the first validation assessment with the second validation assessment, and provides the second validation assessment to the issuer portion.

13. The system of claim 1, wherein the issuer portion further performs a first validation assessment on the transaction based on the transaction data and data retrieved from a third party data source.

14. The system of claim 13, wherein the third party data source comprises at least one of an address database, and an identity verification service.

15. The system of claim 13, wherein the third party data source comprises at least one of a fraud database, an IP address database, and a device information database.

16. A method for authenticating a transaction, comprising:

at a financial institution comprising an acquirer portion, a payment network portion, and an issuer portion:

the acquirer portion receiving, from the merchant, at least one device credential and a payment credential that were received from the payment application in conjunction with a transaction, the acquirer portion further receiving transaction data for the transaction from the merchant;

the acquirer portion performing a first validation assessment on the transaction based on the transaction data and first data retrieved from a first data source;

the payment network receiving, from the acquirer portion, the device credential, the payment credential, the transaction data, and the first validation assessment;

the payment network portion performing a second validation assessment on the transaction based on the transaction data and second data retrieved from a second data source;

the issuer portion receiving, from the payment network portion, the device credential, the payment credentials, transaction data from the acquirer portion and the first validation assessment, and the second validation assessment; and the issuer portion identifying and authenticating the customer based on the device credential, the payment credential, and at least one of the first validation assessment and the second validation assessment.

17. The method of claim 16, wherein the first data source and the second data source comprises at least one of the following: an address database, and an identity verification service.

18. The method of claim 16, wherein the first data source and the second data source comprises at least one of the following: a fraud database, an IP address database, and a device information database.

19. The method of claim 16, further comprising:

the acquirer portion denying the transaction based on the first validation assessment.

20. The method of claim 16, further comprising:

the payment network portion denying the transaction based on at least one of the first validation assessment and the second validation assessment.

\* \* \* \* \*